United States Patent
Lee (10) Patent No.: US 7,339,898 B2
(45) Date of Patent: Mar. 4, 2008

(54) METHOD FOR SETTING DATA TRANSMISSION RATE IN MOBILE COMMUNICATION

(75) Inventor: Sang Ho Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1142 days.

(21) Appl. No.: 10/309,194

(22) Filed: Dec. 4, 2002

(65) Prior Publication Data
US 2003/0117956 A1    Jun. 26, 2003

(30) Foreign Application Priority Data
Dec. 4, 2001    (KR) .............................. 2001-76059

(51) Int. Cl.
H04J 3/14    (2006.01)
H04J 3/16    (2006.01)
(52) U.S. Cl. ...................................... 370/252; 370/465
(58) Field of Classification Search ................. 370/232, 370/236, 252, 333, 332, 335, 441, 450, 457, 370/479, 465, 329, 437
See application file for complete search history.

(56) References Cited

U.S. PATENT DOCUMENTS 5,963,592 A * 10/1999 Kim ........................... 375/232
6,392,993 B1 * 5/2002 Hamilton et al. ........... 370/230

* cited by examiner

Primary Examiner—Doris H. To
Assistant Examiner—Feben Micael Haile
(74) Attorney, Agent, or Firm—Ked & Associates, LLP (57) ABSTRACT

Disclosed is a method of setting a data transmission rate capable of setting data transmission rate of a data packet received from an upper node in mobile communication system based on a wireless environment and retransmission rate. The preferred embodiment provides not only a method to check data flow to optimize the method of assigning and withdrawing wireless channels assigned to the mobile station, but also a method of assigning and withdrawing wireless channels by checking a wireless environment and a data flow at the same time using NAK frame affected by wireless environment. It is thus possible to quickly determine the influence from a wireless environment that frequently varies and to control a data transmission rate while ensuring the mobility of the database.

12 Claims, 10 Drawing Sheets

| Events | Subevents and operations | Factors affecting on subcomponents |
|---|---|---|
| NAK QoS DB | 1 NAK RATE | NAK occurrence frame retransmission RLP RESET and New/IDLE frame transmission |
| | 2 WEIGHT TABLE | Weighting on each of the components and controlling NAK RATE UP/DOWN |
| | 3 FATAL THRESHOLD | Determination factor to determine how much to control the data transmission rate UP or DOWN due to the NAK RATE |
| | 4 RATE MODIFIER | Setting the THRESHOLD value differently according to each data transmission rate |
| | 5 ACTIVATION WAIT TIME | The time when the NAK RATE exceeds the FATAL THRESHOLD |
| NAK QoS Activation State | 1. IDLE STATE<br>2. ACTIVE WAIT STATE<br>3. DOWN STATE<br>4. REASSIGN STATE | |
| NAK RATE UPdate Bolck | Software BLOCK updating NAK-RATE by NAK occurrence, frame retransmission, and RESET procedure | |
| NAK QoS state transition block | Software BLOCK making the transition of NAK QoS state to IDLE, ACTIVE WATE and REASSIGN DOWN by NAK RATE, FATAL THRESHOLD, and ACTIVE WAIT TIME | |

FIG.6

| Events | Weighting scale to control NAK up or down |
|---|---|
| RLP Reset Procedures | Scale Big UP |
| NAK Frame | Scale Small UP |
| Frame retransmission | Scale Small UP |
| New frame transmission | Scale Small DOWN |
| Idle frame transmission | Scale Small DOWN |

METHOD FOR SETTING DATA TRANSMISSION RATE IN MOBILE COMMUNICATION

BACKGROUND OF THE INVENTION

1. Field of the Invention

The present invention relates to a method for setting a data transmission rate in a mobile communication system, and more particularly to a method in which data transmission rate is varied depending on the wireless environment.

2. Background of the Related Art

An important issue in wireless Internet service is the data transmission rate. Currently, mobile communication providers provide mobile communication service at a data transmission rate of 14.4 Kbps (IS95A) and 57.6 Kbps (IS95B). IS95B transmits data at a rate that is four times faster than IS95A. If IS95A and IS95B are used, the quality of service provided to users is quite different. IS95A has the same quality as the mobile communication sending short messages of about 40 letters while IS95B transmits data at 57.6 Kbps since the IS95B has base transmission station channels in parallel.

The channels for data transmission in mobile communication systems below IS95B improved the data transmission rate by using supplemental code channels (hereafter referred to as SCCH as well as a fundamental channel (hereafter referred to as FCH). However, IS95C (IS-2000) was introduced and supplemental channel (hereafter referred to as SHC) can be assigned so that the data transmission rate was increased tenfold over communications that use only FCH. This system is referred to as CDMA2000-1X service.

Figure 1:
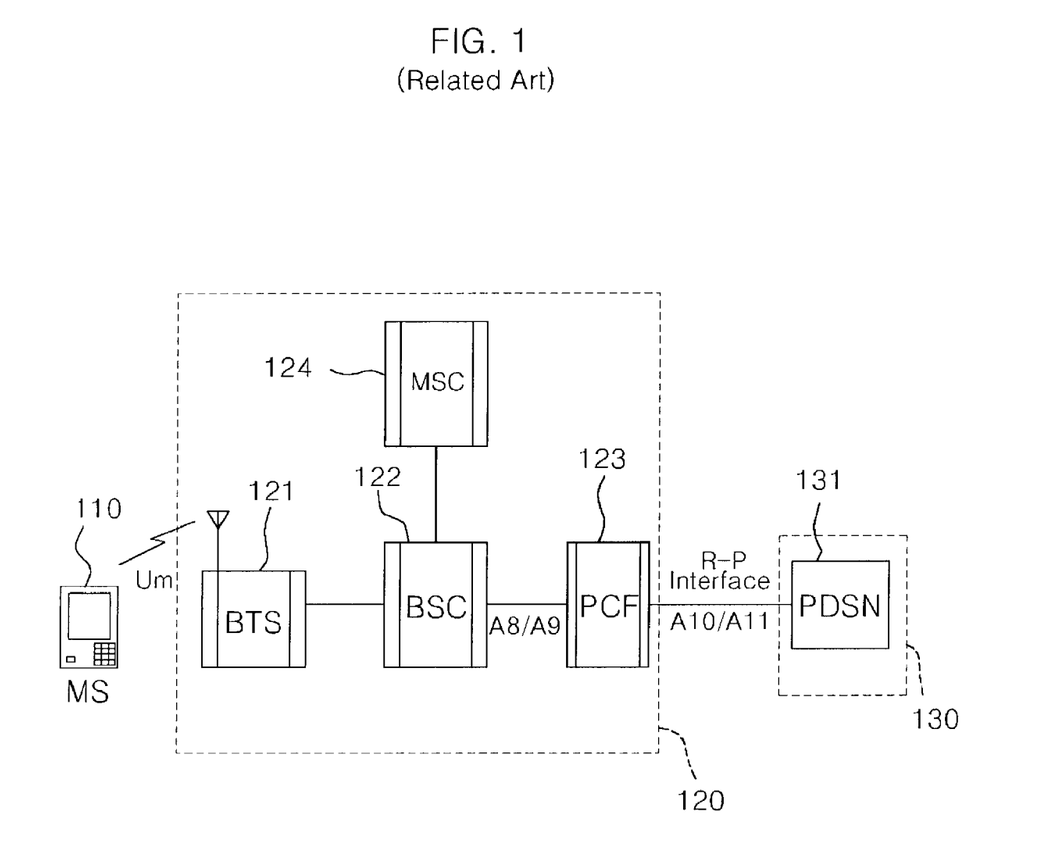
FIG. 1 shows a mobile communication system for packet data services in the related art.

FIG. 1 shows a mobile communication system for packet data services. As illustrated in FIG. 1, the mobile communication system consists of a mobile station 110, a mobile exchange system 120 and a data core network (DCN) 130 having a packet data serving node (PDSN) 131. The mobile exchange system 120 includes a base transmission station (BTS) 121 for controlling the wireless call from the mobile station 110, a base station controller (BSC) 122 for providing the link for transfer of point-to-point protocol (PPP) link data and managing the wireless resource, a packet control function (PCF) 123 for packet connection service and a mobile switching center (MSC) 124. The packet data serving node 130 interfaces between the two networks, a wireless access network (RAN), and the DCN 130.

An operation of the related art mobile communication system for high speed packet data service will be described as follows. The mobile station (MS) 110 requests data service using PPP from the base transmission station (BTS) 121 of the mobile exchange system 120. The base transmission station 121 determines whether the data service requested by the mobile station 110 is a normal request. If the data service requested by the mobile station 110 is a normal request, the base transmission station 121 negotiates a PPP with an upper PDSN 131 through a basic wireless call setup. In this case, the base transmission station 121 is under the control of the base station controller 122. A packet control path is set to a PDSN 130 by a packet controller 123. After PPP negotiation, Internet Protocol (IP) to connect to external data core network (DCN) 130 is allocated to the mobile station 110, and the mobile station 110 is ready to use the data service. The mobile station 110 connects to the external data network and can request and receive the data from the corresponding network.

In other words, if the mobile station 110 using IS95C (CDMA 2000) packet data service requests a packet service, the PDSN 131 to transmit the packet data is determined by the BSC/PCF 122/123. At this time, a wireless traffic channel and the radio link protocol (RLP) Link are set between the mobile station 110 and the BSC 122. The A8/A9 traffic link to transmit the data of the PPP link between the mobile station 110 and the PDSN 130 is set between the BSC 122 and the PCF 123. The A10/A11 RLP link to transmit the data of the PPP link between the mobile station 110 and the PDSN 131 is set between the PCF 123 and the PDSN 131. Data transmission and reception can then be performed.

In order to provide the wireless data service, the Radio Link Protocol (RLP), which is a standard of wireless data defined above, is used. In a wireless environment, bit errors are proportionately higher as compared to a wire environment. When a bit error occurs, data transmission is maintained using RLP based on a Negative Acknowledgment (NAK) and retransmission. For high speed data service, the transmission rate is proportional to the amount of data required by the mobile station, and the transmission path should be determined according to data flow and movement of the mobile station.

The data transmission rate of wireless data calls using conventional PPP is determined by ascertaining data flow and by using the flow control in the upper PPP layer. In other words, since the data transmission rate of the wireless environment is controlled variably only by the amount of data, the efficiency of the wireless data transmission is decreased by a variety of factors that can be generated in a wireless environment. These include transmission output, electromagnetic interference, and NAKs, which are generated by the data processing between the terminal and the base transmission station.

Because the mobile station is designed to be mobile, in order to ensure mobility for wireless data calls, the mobile station often changes its transmission path when it moves. In order to determine the transmission path, the base transmission station ascertains the periodic change of the transmission path. However, determining the change of transmission path causes some trouble to the data transmission. Another disadvantage is that it cannot always change the transmission path at the right time.

The method of determining the transmission rate will be described as follows. If the mobile station uses a high speed data service, more call resources are used than with of the conventional IS95A and IS95B networks. The data flow between the mobile station and an upper PDSN is investigated. If a large amount of data is being transmitted, more call resources are assigned. If a lesser amount of data is being transmitted, the call resources are withdrawn so that the data transmission rate is controlled.

Figure 2:
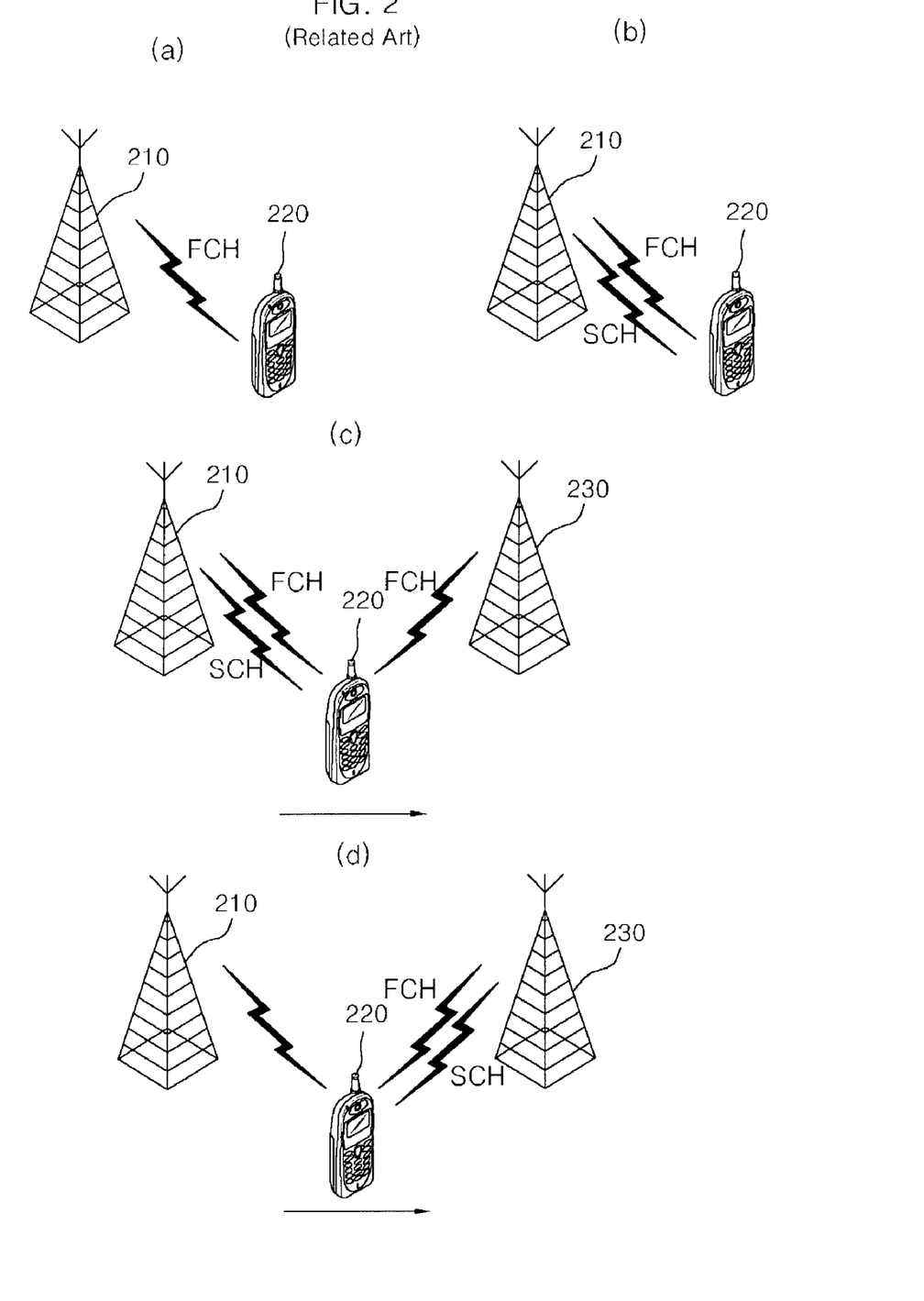
FIGS. 2a through 2d show a channel assignment state according to handoff of a mobile station in the related art.

FIGS. 2a through 2d show handoff of a mobile station. FIG. 2a shows that a base transmission station 210 communicates with a mobile station 220 through FCH. FIG. 2b shows that SCH is additionally assigned while FCH is connected since the amount of data being transmitted has increased. FIG. 2c shows that a new PN with a target base transmission station 230 is added as the mobile station 220 moves from an area covered by the serving base transmission station 210 towards an area covered by the target base transmission station 230. FIG. 2d shows that the mobile station 220 moves to the target base transmission station 230, and the target base transmission station 230 reassigns the SCH between the mobile station 220 and the target base transmission station to another active PN. FCH can connect to a plurality of base transmission stations at the same time, while SCH can generally connect to only one base transmission station in general since wireless resources are wasted if SCH connects to a plurality of base transmission stations at the same time.

The process described above is called handoff or handover. The handoff of a high speed wireless data call includes the FCH handoff and SCH handoff. Each of them is performed as follows.

The FCH handoff takes place when the mobile station moves to a target base transmission station it is using data service from the serving base transmission station. If the pilot strength from the target base transmission station exceeds a predetermined threshold at the mobile station, the mobile station reports this to the serving base transmission station. The mobile station then connects both the serving base transmission station and the target base transmission station at the same time through the SCH. As the mobile station moves away from the serving base transmission station and gets closer to the target base transmission station, the pilot strength of the serving base transmission station decreases below a predetermined threshold and the mobile station disconnects itself from the serving base transmission station. The mobile station then connects to the target base station exclusively through FCH.

The SCH handoff takes place when the mobile station 220 moves to a target base transmission station 230 while the mobile station 220 is using data service provided by the serving base transmission station 210 as shown in FIGS. 2c and 2d. The mobile station 220 reports to a base transmission station 210 that the pilot strength of the serving base transmission station 210 has decreased and the pilot strength of the target base transmission station 230 has increased. The base transmission station compares the pilot strength of the serving base transmission station 210 and the pilot strength of the target base transmission station 230. If the pilot strength of the target base transmission station 230 is greater than the pilot strength of the serving base transmission station 210 by a predetermined amount, the base transmission station 210 reassigns SCH from the serving base transmission station 210 to the target base transmission station 230.

The ADD state occurs when a mobile station moves from a serving base transmission station to a target base transmission station and adds the target base transmission station. The DROP state occurs in handoff when a mobile station moves to a target base transmission station and drops the previous station. The SWAP state occurs when the ADD state and the DROP state occur simultaneously.

In high speed data service, the transmission rate is determined using the FCH and the SCH as the transmission path for the mobile station. If the FCH is assigned and the data flow increases, an additional wireless channel SCH is assigned. At the same time, as the mobile station that uses data service moves, a principal channel and an additional channel should be moved from the serving base transmission station (serving BTS) to the target base transmission station (target BTS). For this, the handoff should be performed to move the channel assigned to the mobile station from the serving base transmission station to the target base transmission station. The mobile station moves from the serving base transmission station to the target base transmission station while the mobile station is using a service of the serving base transmission station FIGS. 2c and 2d). The mobile station reports to a base transmission station that the pilot strength of the serving base transmission station has decreased and the pilot strength of the target base transmission station has increased at the mobile station. The base transmission station compares the pilot strength of the serving base transmission station and the pilot strength of the target base transmission station. In order to determine the appropriate timing for moving wireless resources from the serving base transmission station to the target base transmission station (FIG. 2d), the base transmission station reassigns a wireless channel from the serving base transmission station to the target base transmission station whose pilot strength is greater than that of the serving base transmission station.

When determining the transmission path, the pilot strength of the serving base transmission station is compared with the pilot strength of the target base transmission station, and a wireless channel is reassigned. However, comparison of pilot strengths alone does not ensure optimal data transmission. This is because the pilot strength provided to every mobile station through a pilot channel is affected by the wireless environment as well as other mobile stations which use data and voice service. Additionally, pilot strength is not exactly proportional to the Frame Error Rate (FER) of a traffic channel through which the mobile station directly uses data service. Using comparison of pilot strengths to reassign wireless channels deteriorates data transmission efficiency due to frequent reassigning since the pilot strength can vary frequently.

Figure 3:
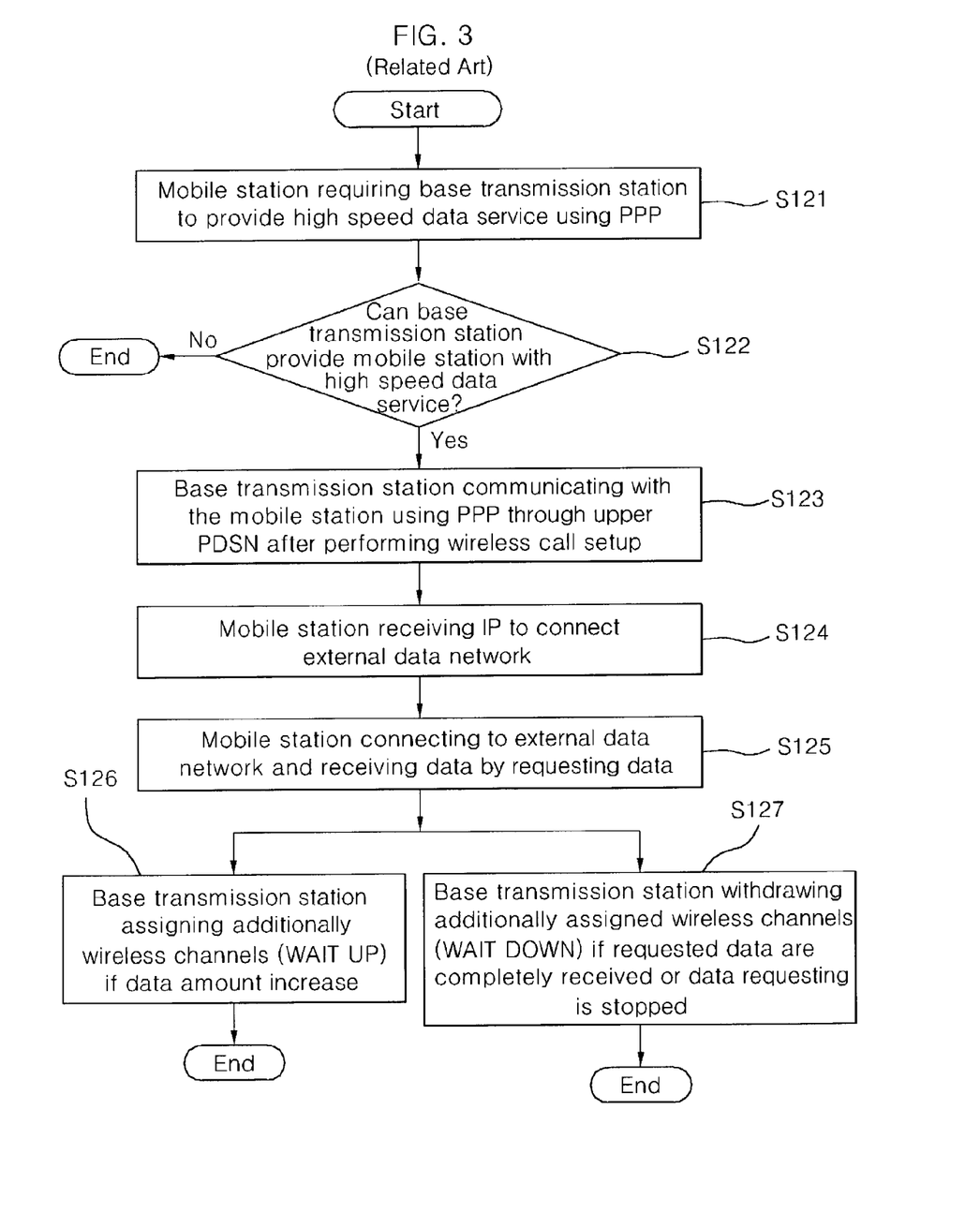
FIG. 3 is a flow chart of a method of assigning and withdrawing call resources to determine data transmission rate when transmitting and receiving data in the related art.
Figure 4:
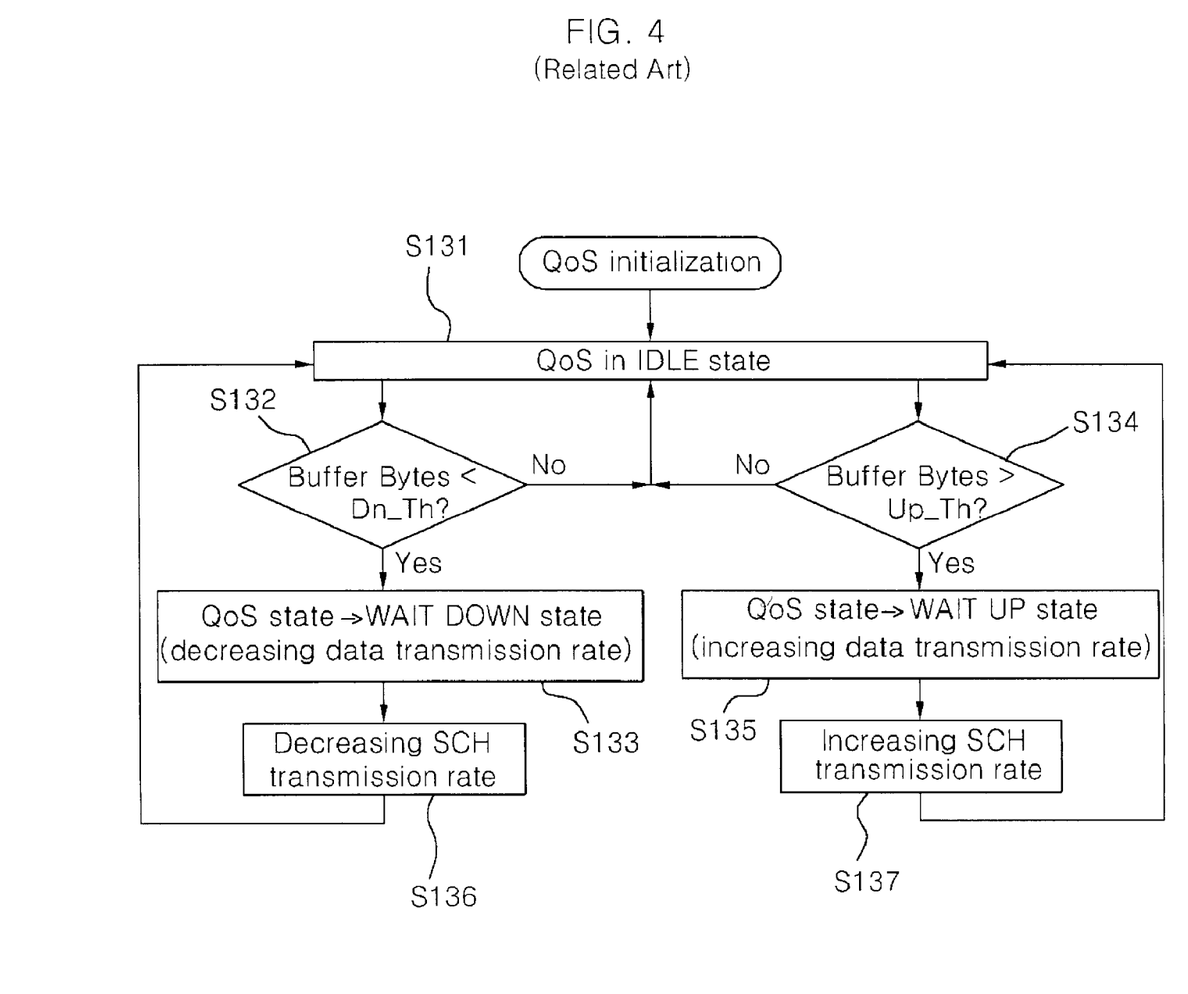
FIG. 4 is a flow chart of the method of determining data transmission rate and transmission path in the related art.

FIG. 3 is a flow chart illustrating a method for assigning and withdrawing call resources to determine data transmission rate when transmitting and receiving data in the system of FIG. 1. First, the mobile station requests the base transmission station to provide a high speed data service using PPP (S121). The base transmission station then determines whether the request to provide service is proper (S122).

If the service request is proper, the base transmission station performs a wireless call setup procedure (S123), and then performs PPP communication with an upper PDSN. As a result, the mobile station is given an IP to connect to data networks (S124). The mobile station connects to an external data network, requests data and receives the requested data, (S125).

In this case, if the amount of the data requested by the mobile station exceeds a predetermined amount, the base transmission station assigns as additional wireless channel to increase the transmission rate so that data transmission is more effective (WAIT UP) (126). If all of the data requested by the mobile station is received, or the data request is stopped, the additional wireless channels are all withdrawn (WAIT DOWN) (S127). However, when the data flow between the mobile station and the upper PDSN is checked and additional wireless channels are assigned or withdrawn, the channels are assigned or withdrawn without taking into account the effect of the wireless environment.

In other words, the mobile station uses the wireless link protocol (RLP: Radio Link Protocol). This protocol is based on sequential data transmission and is a NAK based protocol which requests retransmission if the data is not received normally, due to either the wireless environment or other reasons.

If the mobile station uses data service and retransmissions occur frequently, data transmission may not be performed normally. The data transmission is decreased by controlling the data flow between an external data network server and the mobile station if data transmission is not performed normally. Additionally, the base transmission station withdraws the corresponding wireless channels.

A disadvantage of the related art is that is takes too much time to withdraw channels. If retransmission does not continue to occur, or does not occur in a short amount of time, the data transmission rate is decreased through flow control even though the wireless environment improves. The method of assigning and withdrawing wireless channels by checking the data flow is not in keeping with the nature of the wireless environment, which varies frequently. Consequently, the optimal data transmission rate suitable to the wireless environment cannot be found. The related art has a problem in that the optimal transmission rate and transmission path are not provided, since the wireless environment is not considered when determining the transmission rate or the transmission path for providing a high speed data service to a mobile station.

The method of determining the transmission rate and the transmission path in a mobile communication system for packet data service in the related art will now be described.

First, the method of determining the transmission rate in the related is described. A mobile station that uses IS95C high speed data service requires more call resources than a mobile station using IS95A and IS95B data service. Accordingly, the data flow between the mobile station and an upper PDSN is checked. More call resources are assigned when there is a large amount of data. The call resources are withdrawn when there is a small amount of data. The data transmission rate is controlled manually.

Second, the method of determining the transmission path in the related art is described. In IS95C data service, data transmission rate is determined using a fundamental channel (FCH) and a supplemental channel (SCH). As shown in FIGS. 2a and 2b, if data flow is increased after assigning FCH, SCH is assigned in addition to FCH. As shown in FIGS. 2c and 2d, as the mobile station that uses data service moves, FCH and SCH are moved from the serving base transmission station assigned beforehand to the target base transmission station that the mobile station moves to.

In order to control the data transmission rate both up and down, the following is defined. The supplemental channel SCH is assigned to use CDMA 2000 1 X packet data service. According to the speed of SCH, the SCH occupies 0, 1, 2, 4, 8 and 16 channel resources. Each of these speeds is expressed as follows: SCHR_0X, SCHR_1X, SCHR_2X, SCHR_4X, SCHR_8X, and SCHR_16. Accordingly, the current SCH rate (SCHR) is determined to be any one of six. The reference to increase the transmission rate from current SCH rate to an upper speed is up-threshold. The reference to decrease the transmission rate from current SCH rate to a lower speed is down-threshold. In other words, if the amount of the data exceeds the up-threshold, the transmission rate is increased to an upper speed. If the amount of the data falls below the down-threshold, the transmission rate is decreased to the lower speed.

However, the above-mentioned method of setting the data transmission rate and the transmission path in the related art has various problems.

For example, in determining transmission rate, the base transmission station checks the data flow between a mobile station and a PDSN and makes a determination to either assign additional wireless channels or withdraw wireless channels. However there is a problem with the method described above in that the reference to assign additional wireless channels or withdraw wireless channels is based simply on data flow, without considering the influence of the wireless environment of the present situation. The mobile station uses RLP (Radio Link Protocol) for high speed data service. This is a retransmission based protocol (NAK Based Protocol) which makes a request for retransmission if the data not normally transmitted due to either the wireless environment or other causes. If a large number of NAK messages are generated while the base transmission station provides some data service to the mobile station, data transmission is not performed normally. If the data transmission is not performed normally, as described above, the data transmission is decreased by flow control imposed between an external network server and the base transmission station. The base transmission station then withdraws wireless channels. This makes the channel withdrawal process take too much time.

Additionally, if retransmission does not continue to occur, or does not occur in a short amount of time, the data transmission rate is decreased even though the wireless environment improves at the time to withdraw the wireless channel through flow control. In other words, the method of assigning and withdrawing wireless channels by checking the data flow is not in keeping with the nature of the wireless environment, which varies frequently. Consequently, the optimal data transmission rate suitable to the wireless environment cannot be found.

Moreover, when determining the transmission path, the pilot strength of the serving base transmission station is compared with the pilot strength of the target base transmission station and a wireless channel is reassigned. However, comparison of pilot strengths alone does not ensure optimal data transmission. This is because the pilot strength provided to every mobile station through a pilot channel is affected by the wireless environment, as well as other mobile stations which use data and voice service.

Additionally, pilot strength is not exactly proportional to the FER (Frame Error Rate) of a traffic channel through which the mobile station directly uses data service. The method of reassigning a wireless channel by using only the pilot strengths deteriorates data transmission efficiency due to frequent reassigning, as pilot strength varies frequently.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide an improved system and method for determining data transmission rate and data transmission path.

It is another object of the present invention to provide not only a method to determine data transmission rate and data transmission path from data flow, but also a method of controlling data transmission rate of a mobile communication system in which NAK frame is used to determine wireless environment and data flow are concurrent, and assign and withdraw wireless channels.

It is another object of the present invention to provide a method of controlling data transmission rate of a mobile communication system in which SCH can be assigned when either the amount of data received or NAK RATE exceeds a preset reference and continues to exceed said preset reference for a predetermined amount of time.

To achieve at least the above objects in whole or in parts, there is provided a method for controlling data transmission rate of a mobile communication system wherein a base transmission station system transmits and receives data so as to transmit data received from an upper node to a mobile station, including (a) a first transmission rate control step of comparing amount of data received from the upper node with a threshold and increasing or decreasing the data transmission rate depending on a comparing result; and (b)

a second transmission rate control step of computing an NAK RATE depending on increase and decrease of the transmission rate of when the data is transmitted or received, comparing the computed NAK RATE with a preset threshold, and increasing or decreasing the data transmission rate depending on a comparing result.

Preferably, the first transmission rate control step (a) includes: (a-1) assigning a wireless channel additionally to increase the transmission rate if data is received from the upper node and an amount of the received data is greater than an up threshold; (a-2) canceling the assigned wireless channel to decrease the data transmission rate if the amount of the received data is less than a down threshold; and (a-3) maintaining the data transmission rate if the amount of the received data is not between the up threshold and the down threshold.

Preferably, the second transmission rate control step (b) including (b-1) if the NAK rate is computed, comparing the computed NAK RATE with the preset fatal threshold; (b-2) driving a corresponding timer if the NAK RATE is greater than the preset fatal threshold; (b-3) controlling the data transmission rate if the NAK RATE is maintained to be greater than the preset fatal threshold while the timer is terminated.

Alternatively, the second transmission rate control step (b) includes the step of: (b-1) increasing or decreasing a speed of an SCH for transmission channel according to the mobile station's movement when a received data retransmission rate is maintained to be greater than the fatal threshold for a predetermined time.

Preferably, the base transmission station receiving the data from the upper nodes controls the data transmission rate according to the amount of the received data and the NAK RATE required by the mobile station.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The preferred embodiment of the present invention allows comparison of the amount of data received from upper node (PDSN) and data transmission rate with a reference value to control the data transmission rate according to the result of the comparison as well as its duration.

Figure 5:
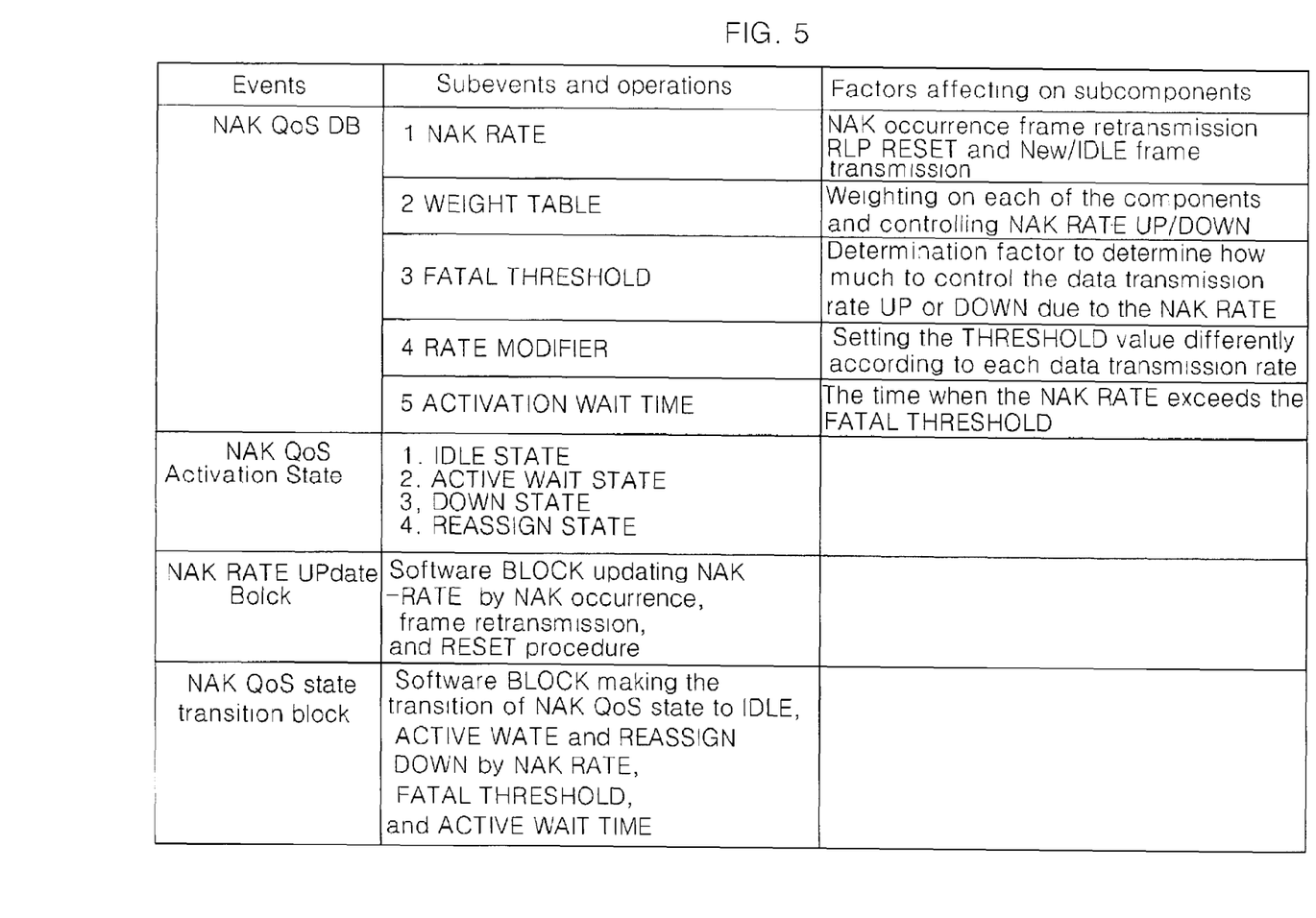
FIG. 5 is a table showing events and their roles in the algorithm used to determine data transmission rate and transmission path in a method of controlling the data transmission rate of a mobile communication system according to a preferred embodiment of the present invention.

FIG. 5 is a table showing elements and their roles in the algorithm used to determine data transmission rate and transmission path according to a preferred embodiment of the present invention.

In order to determine the data transmission rate and a transmission path, the preferred embodiment of the present invention considers the problems associated with data transmission, data flow, and pilot strength in the related art, and applies the result of the algorithm of FIG. 5 to determine the appropriate data transmission rate and the transmission path.

The algorithm shown in FIG. 5 is preferably executed in a data handling processor in the mobile communication system shown in FIG. 1. This data handling processor creates RLP traffic frames and processes signaling messages to a traffic channel, and is constituted as follows.

An upper base transmission station includes parameters such as retransmission rate (NAK RATE), QoS (Quality of Service), database ()B), weight table (WEIGHT TABLE), fatal threshold (FATAL_Th), rate modifier (RATE_MODIFIER), and activation wait time (ACTIVATION WAIT TIME).

Unstable factors that may be generated when transmitting and receiving data in a wireless environment can include NAK frame occurrences, frame retransmission, RLP RESET, and the transmission result of NEW/IDLE FRAME. Therefore, the NAK frame occurrence, the frame retransmission, the RIP RESET, and the NEW/IDLE FRAME transmission processing are converted into NAK RATE to examine the present wireless environment.

In this case, NAK is a kind of frame defined by the data transmission and reception procedure using RLP. NAK makes a request to retransmit lost frames in transmitting and receiving sequential frames.

The NEW FRAME transmits new data continuously to a base transmission station at the present transmission rate since NAK does not occur when transmitting data from PDSN to the base transmission station (or from the base transmission station to the mobile station). The IDLE FRAME transmits only a header, without body, when transmitting data at the data transmission period (20 ms). In other words, in the transmission of NEW/IDLE FRAME, there are no requests for retransmission, and no means to decrease retransmission rate. The retransmission rate is set within a range of thresholds, as it is increased or decreased based on up-threshold (Up_Th) and down-threshold (Dn_Th). The FATAL_Th determines how much to increase or decrease the transmission rate due to the increase of the retransmission rate. Each of the rate modifiers is given a different threshold value based on its respective data transmission rate. The ACTIVE WAIT TIME is the time when the retransmission rate exceeds the fatal threshold.

Figure 7:
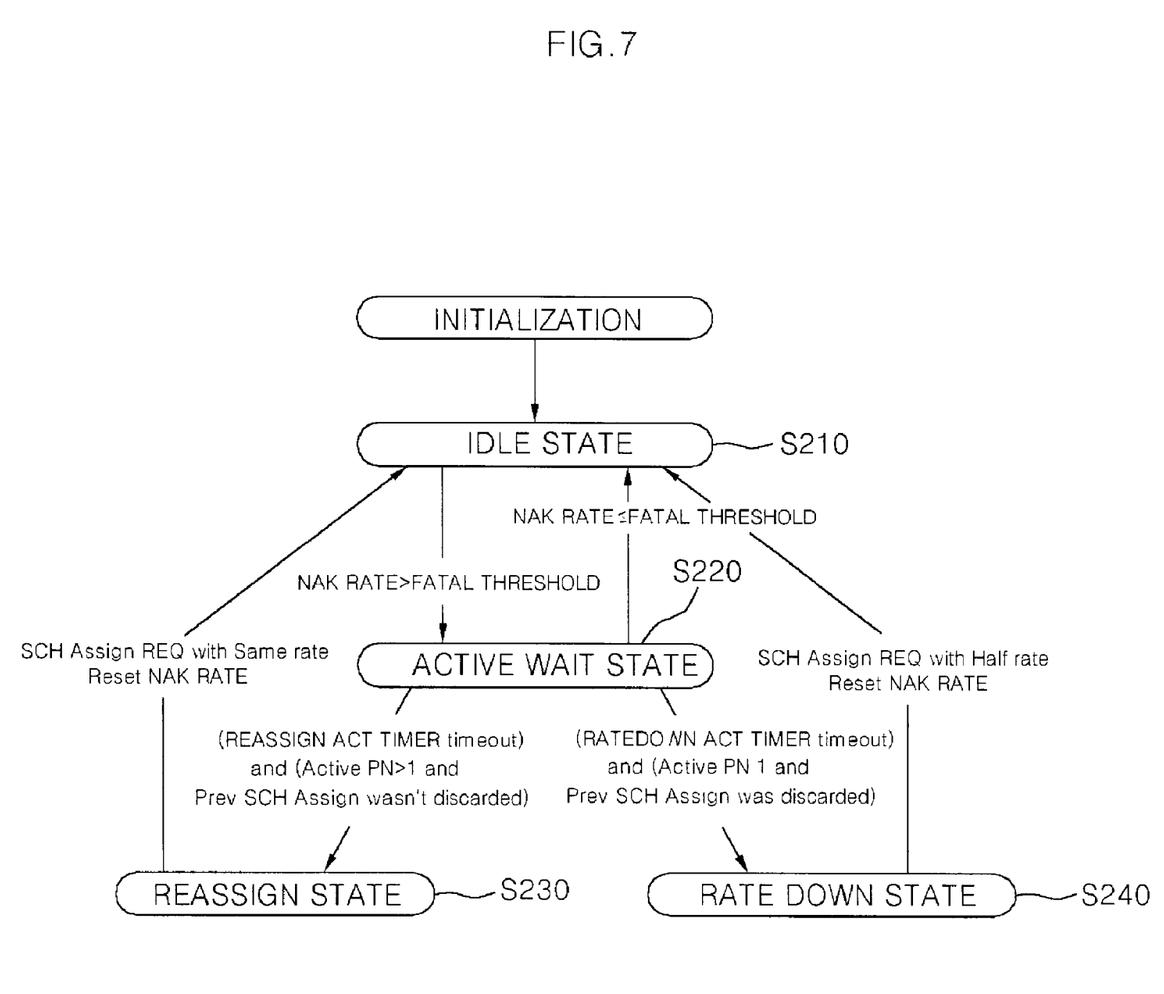
FIG. 7 is a WEIGHT TABLE of the events of NAK QoS DB to change NAK RATE in the method of controlling the data transmission rate of mobile communication system.

The retransmission QoS activation state (NAK QoS Activation State) is classified as idle state (IDLE STATE) S210, active wait state (ACTIVE WAIT STATE) S220, reassign state (REASSIGN STATE) S230, or rate down state (RATE DOWN STATE) S240, depending on the wireless environment as shown in FIG. 7.

The idle state (IDLE STATE) S210 is the state in which the data transmission and reception encounters no trouble, and is the QoS operation state in which the data transmission rate is determined according to the general data flow.

If the NAK RATE increases due to the influence of the wireless environment and exceeds the preset fatal threshold, it makes the transition from the idle state to the active wait state, so that a timer (or a counter) is driven. If the retransmission rate decreases below the threshold before the timer is terminated (timeout), it makes the transition from the active wait state S220 to the idle state S210.

In the active wait state S220, if a rate down activation timer is terminated, the number of present active pilots is counted. If the number of active PN is one, it makes the transition to the rate down state S240. In this case, in the rate down state, data transmission rate is adjusted to half of the present transmission rate.

In the active state S220, if a reassign activation timer is terminated, the number of the present active pilots is counted. If the number of active PN is two or more than two, it makes the transition to the reassign state S230. In the reassign state S230, the data link is reset to the pilot PN to ensure the best quality based on the strength of the pilot received by the mobile station and FER. In this case, PN is a type of short code used in a forward channel, and the code used by mobile stations to identify base transmission stations. The PN is the number of connections between the mobile stations and the base transmission stations.

Such increase of the NAK RATE is improper to the wireless environment. The fatal threshold is the reference used to determine how much to decrease the transmission rate due to the increase in the retransmission rate (NAK RATE). If the retransmission rate continues to exceed the fatal threshold, the transmission rate is controlled.

Since the factors (NAK occurrence, FRAME retransmission, RESET procedure, NEW/IDLE FRAME) which tend to deteriorate transmission quality in the wireless environment have different effects based on transmission rate, each threshold is set differently depending upon each transmission rate. The rate modifier, which determines the threshold decides how the threshold is set based on each transmission rate.

Figure 6:
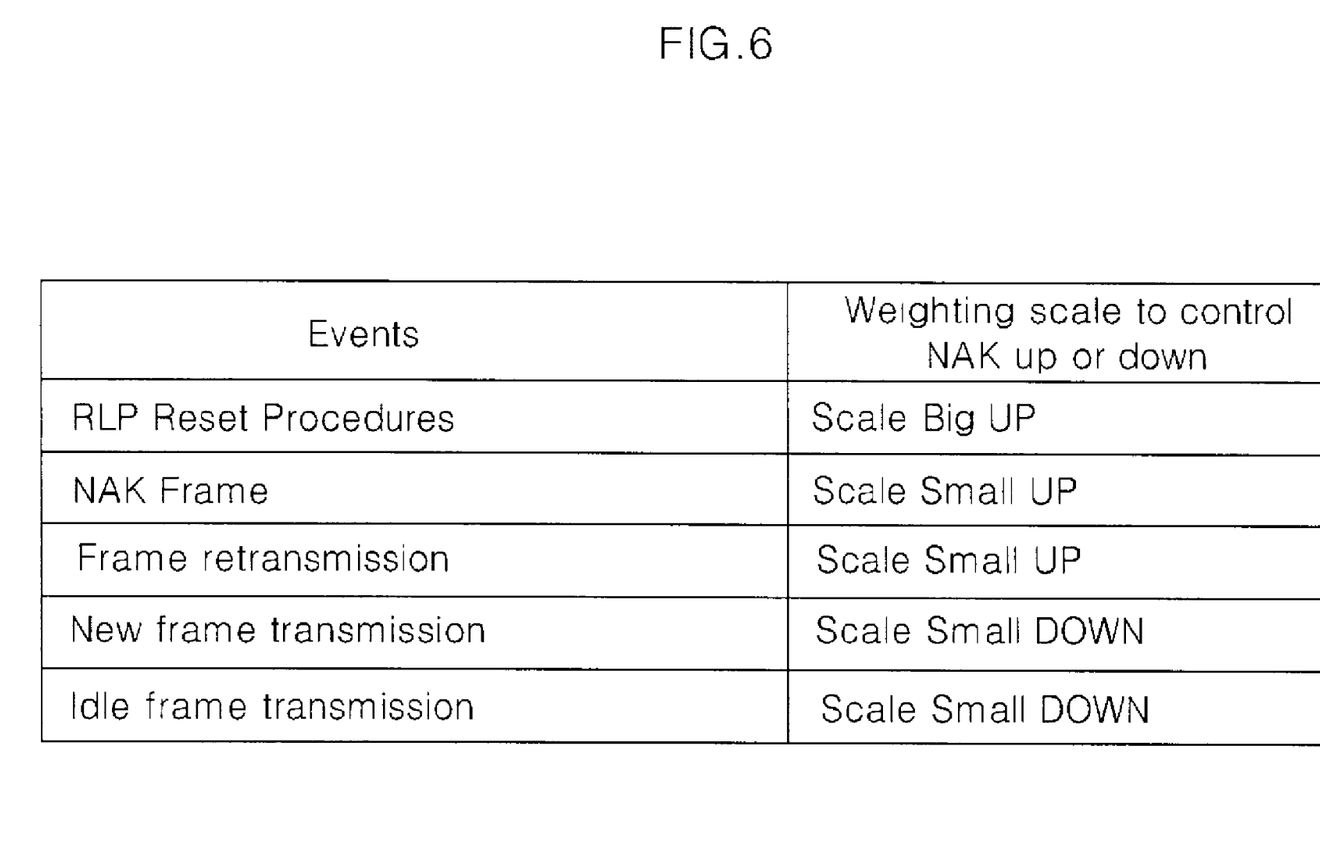
FIG. 6 is a table showing NAK QoS activation state according to a preferred embodiment of the present invention.

The retransmission rate update block is a software block that updates the retransmission rate by performing the retransmission (NAK) occurrence, frame retransmission and reset procedure every 20 ms period while the frames are received from a mobile station. The transmission QoS state transition block is a software block that makes the transition of the retransmission QoS state to the idle state, the active wait state, the reassign state and the rate down state by using the retransmission rate, the fatal threshold and the active wait time. The construction values of the NAK QoS DB are used as the factors to determine transmission rate and transmission path. The weight table is set to determine the retransmission rate as shown in FIG. 6.

According to the weight table, weights are set based on NAK occurrence, frame retransmission, reset procedure, and NEW/IDLE FRAME, respectively. Each of the weights is classified into Positive, Negative, Big and Small, and applied to all wireless link protocol (RLP) processing. These weights provide a scale for increasing or decreasing the retransmission rate (NAK RATE). The more critical the events are, the greater value the references of the weights are set to be. In other words, since the RLP reset is a critical event, the weight is set at a higher value to increase the retransmission rate. In this case, Small Up/Dn and Big Up/Dn are the scales used to increase or decrease the NAK RATE.

NAK QoS Activation state is described with reference to FIG. 7. FIG. 7 is a flow chart showing a method for controlling data transmission rate depending on QoS and NAK QoS of the preferred embodiment of the present invention. As shown in FIG. 7, the influence from the wireless environment is described numerically as NAK RATE. If the NAK RATE increases and exceeds a predetermined value, and it is determined that the data transmission and reception is not reliable, the transmission rate is decreased or the transmission link is reset. Decreasing the transmission rate and resetting the transmission path are different from each other. Each of them is determined depending upon the state transition condition.

Figure 8:
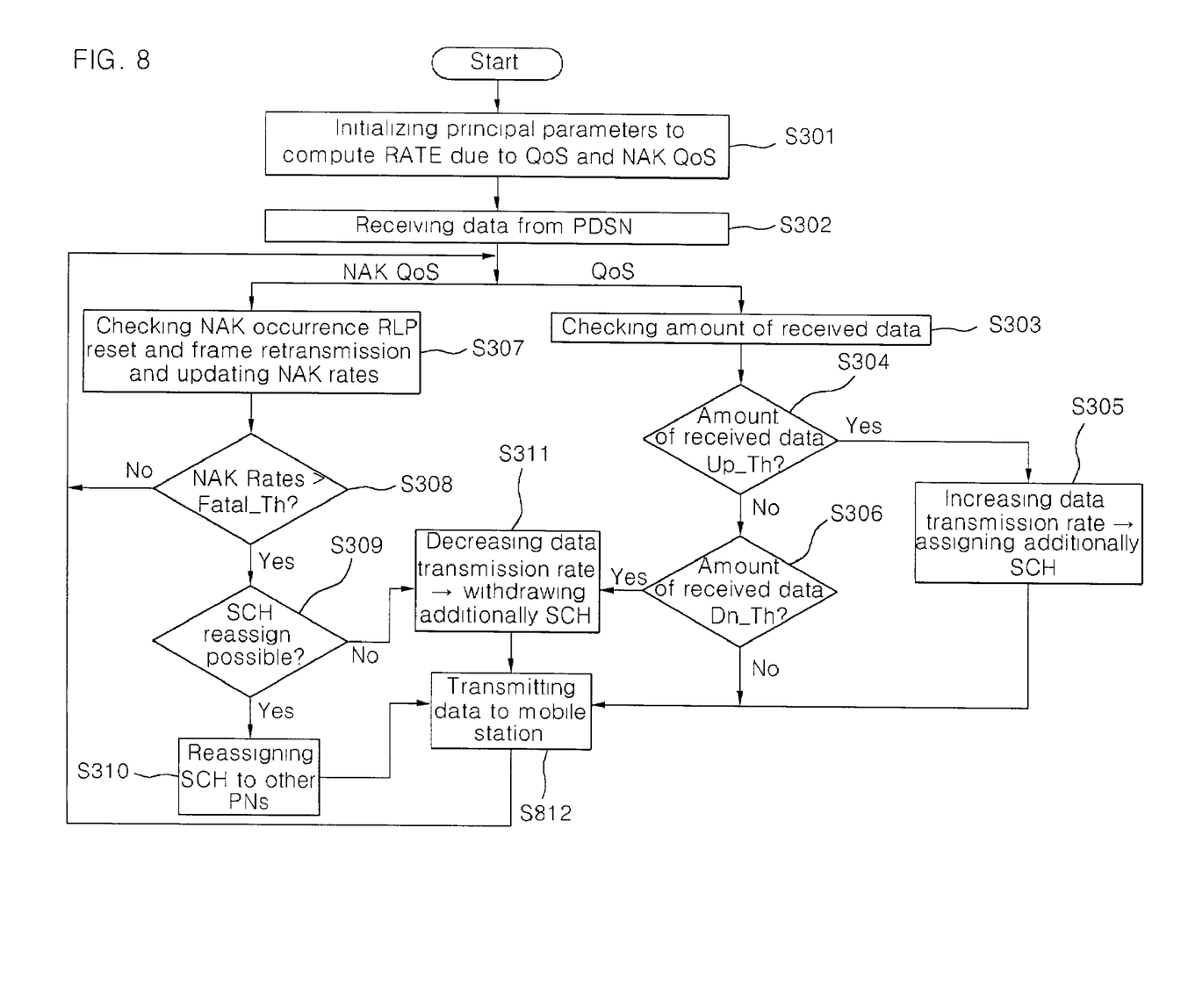
FIG. 8 is a flow chart showing determination of data transmission rate and transmission path due to NAK QoS of the preferred embodiment of the present invention.

Referring to FIG. 8, the principal parameters are initialized to compute QoS and NAK QoS RATE (S301). First, a base transmission station receives data from an upper node (PDSN) (S302). The amount data received is checked (S303). The amount of checked data is compared with the reference (Up_Th) to increase the transmission rate and the reference (Dn_Th) to decrease the transmission rate, respectively (S304 and S306). In this case, if the amount of data is greater than the UP reference (Up_Th), a supplemental channel (SCH) is assigned to increase the data transmission rate (S304 and S305). If the amount of the data is less than the DOWN reference (Dn_Th), a supplemental channel (SCH) is withdrawn to decrease the data transmission rate (S306, S311 and S312). If the amount of the data is not between the UP reference (Up_Th) and the DOWN reference (Dn_Th), supplemental channel (SCH) is neither assigned nor withdrawn, and the data is transmitted at the previous transmission rate (S305 and S312).

Then, after checking for the NAK occurrence, RLP reset, and frame retransmission during data transmission and reception, data transmission rate is updated depending upon the result of the checking (S307). In other words, the retransmission rate is updated based on the weight table shown in FIG. 6 for the frames transmitted to and received from the mobile station. The retransmission rate is ascertained at every frame, and this retransmission rate is then compared with a fatal threshold (FATAL_Th) (S308). If the retransmission rate is greater than the fatal threshold, it is determined whether or not it can be reassigned (S309). If it can be reassigned, SCH is reassigned to other PNs to transmit data to the mobile station (S310). If it cannot be reassigned, the assigned SCH is withdrawn to decrease the data transmission rate (S311). The data is transmitted to the mobile station at the decreased data transmission rate (S312). At this point, if the retransmission rate is greater than a predetermined value (NAK RATE>FATAL_Th), the SCH is reassigned and the PNs (that is, base transmission stations) are added to the mobile station that is using data call service, or the one PN is added to the mobile station that is using data call service. If PNs are added, the base transmission station receives pilot strength and FER, and reassign SCH to the PN that will provide the best quality (S310). However, even though there are a plurality of PNs, if the selected PN is the present reference PN, interference exists at the boundary area of the base transmission station, and the SCH transmission rate is decreased accordingly. On the other hand, if only one PN is added, NAK RATE is increased due to the transmission power and noise of the base transmission station, and the supplemental channel transmission is decreased to achieve effective data transmission (S311 and S312).

Figure 9:
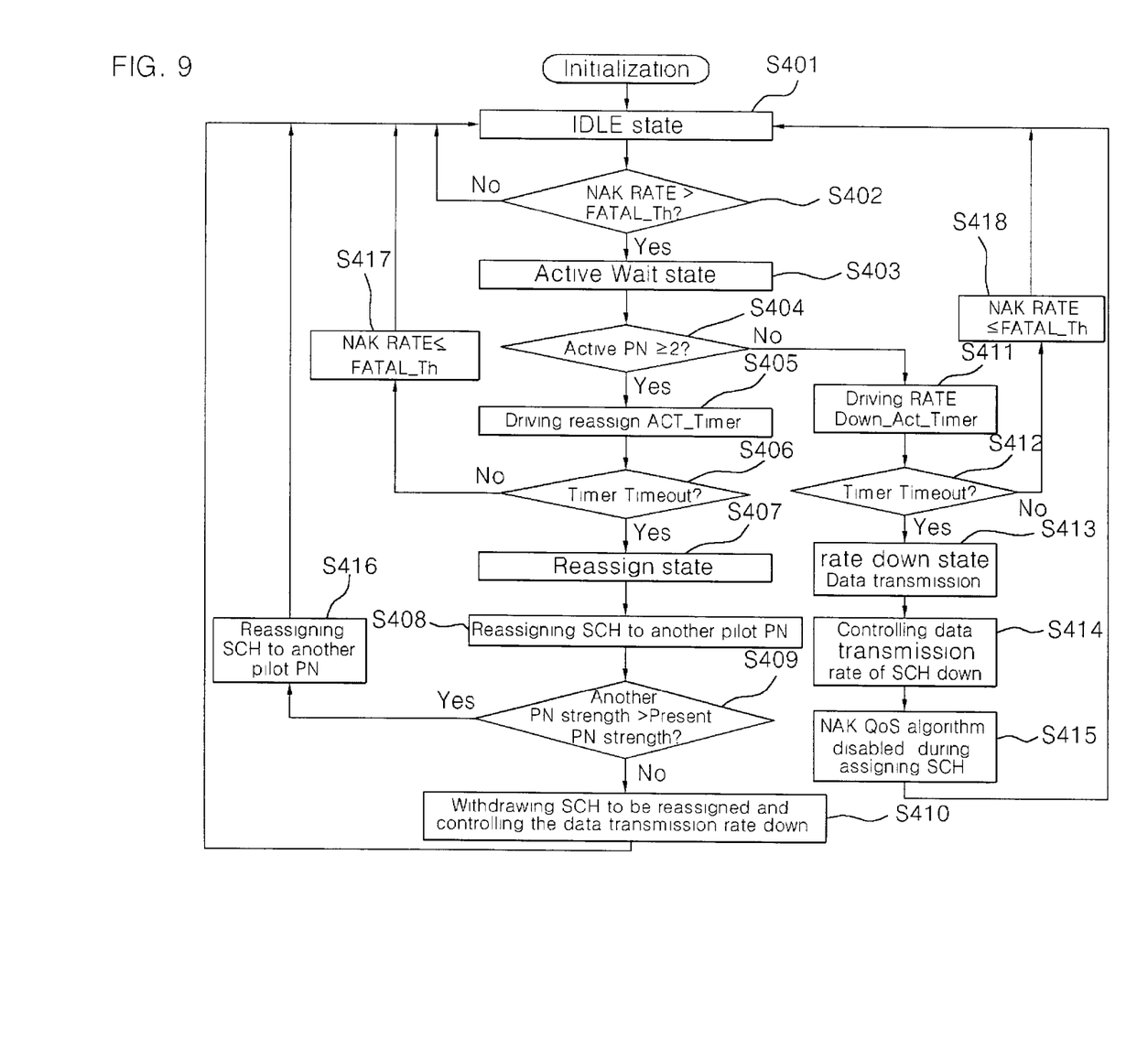
FIG. 9 is a flow chart showing operation state of QoS and NAK QoS according to a preferred embodiment of the present invention.

FIG. 9 is a flowchart which describes the transition operation of states of NAK QoS illustrated in FIG. 8. First, the present transition rate and the assigned transition rate are operated normally and NAK QoS is initialized. Then, the QoS state is set to the IDLE state, in which data transmission and reception do not have any trouble (S401). If the retransmission rate, computed sequentially during transmitting and receiving data, exceeds the fatal threshold (NAK RATE>FATAL_Th), NAK QoS state makes the transition from the idle state to the active wait state (S402 and S403).

In the active wait state, it is determined whether there are two or more PNs. If there are two or more PNs (Active PN$\geq$2, S404), the rate down activation timer is driven (S412). Otherwise, the reassign timer is driven (S405). If there are less than two PNs (Active PN$\leq$1), (S404), the rate down activation timer (RATE Down_ACT_Timer) is driven (S412). After the step S405, if the retransmission rate is decreased below the fatal threshold (NAK RATE$\leq$FATAL_Th) before the timer is terminated, the NAK QoS state makes the transition to IDLE state (S406 and S417). However, if the reassign timer is terminated, the transition is made to reassign state and the SCH is reassigned at the previous transmission rate (S407). In this case, in order to reassign SCH from the reference PN to another PN (Another PN), the pilot strength is compared with the previous reference. If the pilot strength is greater than the previous reference by a predetermined amount, SCH is reassigned to another PN (S408, S409 and S416).

On the other hand, if the pilot strength of the reassigned PN is not greater than the pilot strength of the previous PN by a predetermined amount, the reassigned PN reassigns SCH to the previous reference PN (S409). The SCH reassigned to the previous reference PN is withdrawn and the transmission rate is decreased (S410). If there is one or less Active PN (Active PN$\leq$1), the rate down activation timer is driven (S411). When the rate down activation timer is terminated (S412), the transition of the active wait state is made to the rate down state, the SCH rate is decreased to half ($\frac{1}{2}$) rate (S413 and S414). During this time, the NAK QoS algorithm is in disable state while reassigning SCH (S415).

On the other hand, if NAK RATE is decreased to or below a fatal threshold (NAK RATE$\leq$FATAL_Th) before the rate down activation timer is terminated, the transition of NAK QoS state (S401) is made to the idle state (S418). The NAK QoS procedure shown in FIG. 9 is performed differently from the QoS procedure shown in FIG. 3. After SCH rate is decreased by NAK QoS and data transmission rate is decreased, the wireless environment improves and SCH rate is increased through the QoS WAIT UP procedure of the QoS shown in FIG. 3.

Considering the increase and decrease of the NAK RATE, the fatal threshold depends on the present SCH speed since the fatal threshold is the value that was determined by measuring the mean NAK RATE at the time thought to be the most proper to control RATE. The NAK RATE is computed without reference to speed, but the retransmission rate may be controlled according to the current speed, as the fatal threshold depends upon speed. The active wait time in step S403 allows for wait time, prevents controlling the data transmission rate if the NAK RATE exceeds the threshold, and prevents decreasing the speed in response to every instantaneous NAK occurrence. Accordingly, activation time is established as the reference for decreasing speed. The activation time is the time during which the NAK RATE continues to exceed a threshold (Th). The activation time is the value that was determined to be the most proper to control the speed of SCH.

Figure 10:
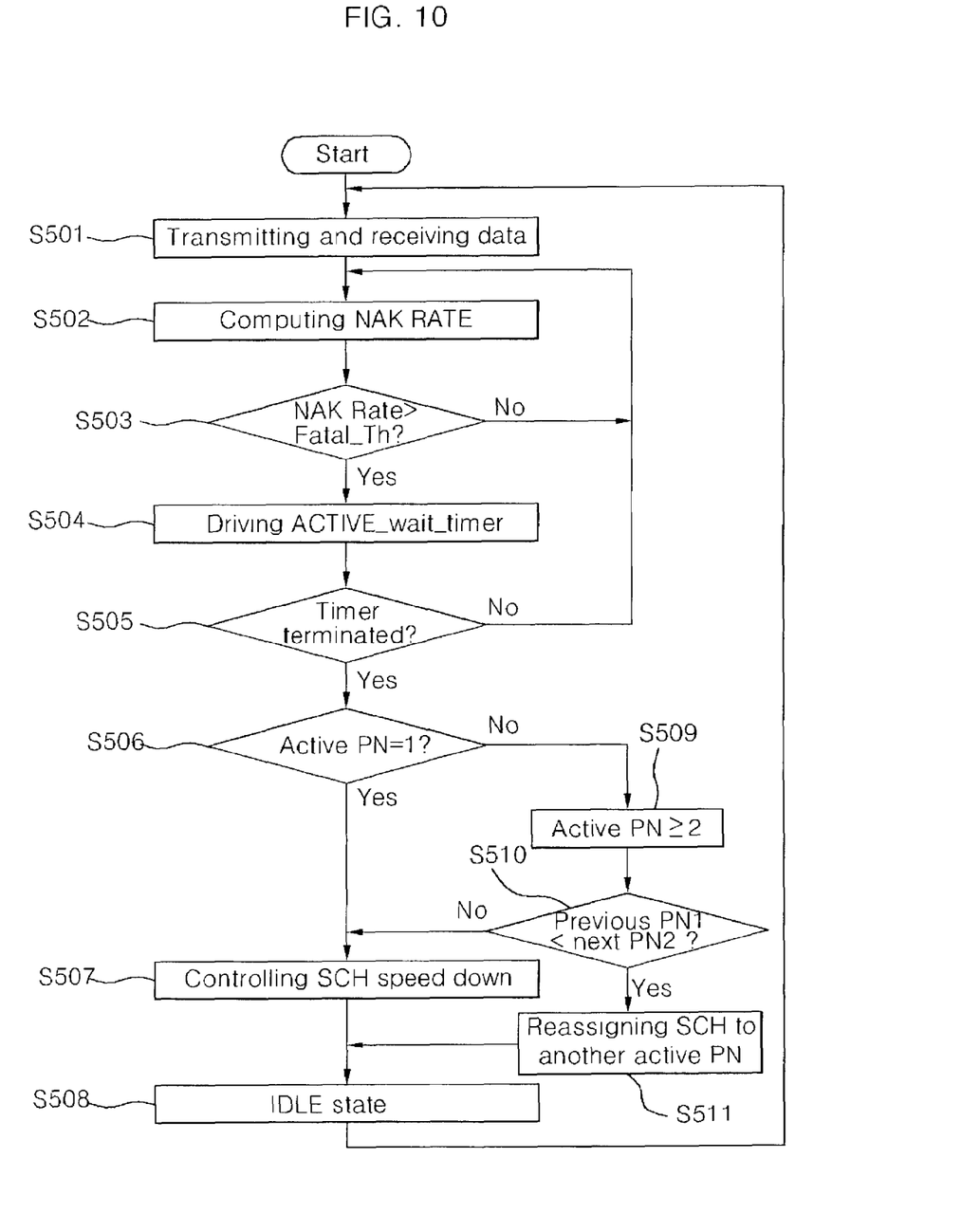
FIG. 10 a flow chart showing a method of setting data transmission rate and transmission path according to a preferred embodiment of the present invention.

Referring to the structure above and the flowchart shown in FIG. 9, the method of setting transmission rate and transmission path of the preferred embodiment of the present invention is described with respect to FIG. 10. The preferred embodiment of the present invention relates not only to a method for optimally assigning and withdrawing wireless channels using a data flow (related art—FIG. 3) but also to a method of assigning and withdrawing wireless channels by determining wireless environment and data flow simultaneously using NAK frame (the preferred embodiment of the present invention—FIG. 8).

Referring to FIG. 10, a base transmission station and a mobile station transmit data to each other (S501). The base transmission station computes the NAK RATE transferred from the mobile station accompanied by data transmission and reception (S502). The computed NAK RATE is compared with the preset fatal threshold (FATAL_Th) (S503). If the NAK RATE is less than the fatal threshold (FATAL_Th), the process returns to the step (S502) in which the NAK RATE is computed. If the NAK RATE is greater than the fatal threshold (FATAL_Th), the corresponding timer (Active_Wait_Timer) is driven (S504). After the timer is terminated (S505), the number of the current activation PNs is determined (S506). If the number of the current activation PNs is one, the speed of the SCH is decreased (S507), and the transition is made to the idle state (S508). However, if the number of the current activation PNs is two or more (S509), the PN strength of the service is compared with another PN strength (S510). If the PN strength of the service is greater than the reference PN strength, the speed of the SCH is decreased (S507). If the reference PN strength is greater than of the PN strength of the service being used, the SCH is reassigned to another activation PN and the transmission rate is increased (S511). Then, the transition is made to the idle state (S508).

As described above, the preferred embodiment of the present invention relates not only to a method for optimally assigning and withdrawing wireless channels using data flow, but also to a method of assigning and withdrawing wireless channels by determining wireless environment and data flow simultaneously using NAK frame.

According to the preferred embodiment of the present invention, it is possible to optimize assignment and withdrawal of wireless channels from data flow. In addition, it is also possible to determine wireless environment and data flow at the same time using NAK frame and assign and withdraw wireless channels. As a result, it becomes possible to quickly determine the influence of the wireless environment, which varies frequently and to control data transmission rate while ensuring the mobility of the database, thereby providing optimal wireless data service.

Moreover, according to the preferred embodiment of the present invention provides not only a method for optimally assigning and withdrawing wireless channels using data flow, but also a method of assigning and withdrawing wireless channels by determining wireless environment and data flow simultaneously using NAK frame affected by the wireless environment to thereby determine quickly the influence from the wireless environment that varies frequently due to nature of wireless data service, and to control data transmission rate by ensuring the mobility of the database.

The foregoing embodiments and advantages are merely exemplary and are not to be construed as limiting the preferred embodiment of the present invention. The present teaching can be readily applied to other types of apparatuses. The description of the preferred embodiment of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures

What is claimed is:

1. A method for controlling data transmission rate of a mobile communication system, wherein a base transmission station system transmits and receives data so as to transmit data received from an upper node to a mobile station, comprising:

(a) comparing an amount of data received from the upper node with a prescribed threshold, and adjusting a data transmission rate depending on a result of said comparison, comprising:

assigning an additional wireless channel to increase the data transmission rate if data is received from an upper node and the amount of received data is greater than an up threshold;

canceling an assigned wireless channel to decrease the data transmission rate if the amount of the received data is less than a down threshold; and maintaining the data transmission rate if the amount of the received data is between the up threshold and the down threshold;

(b) computing a negative acknowledgment rate (NAK RATE) based on the increase or decrease of the data transmission rate when the data is transmitted or received; and (c) comparing the computed NAK RATE with a prescribed threshold, and increasing or decreasing the data transmission rate depending on a result of said NAK RATE comparison.

2. The method of claim 1, wherein comparing the computed NAK RATE comprises:

comparing the computed NAK RATE with a prescribed fatal threshold when the NAK RATE is computed;

driving a corresponding timer if the NAK RATE is greater than the prescribed fatal threshold; and controlling the data transmission rate if the NAK RATE is greater than the prescribed fatal threshold when the timer is terminated.

3. The method of claim 2, wherein controlling the data transmission rate comprises:

ascertaining a number of activation pseudonoise sequences (PNs) if the NAK RATE is greater than the prescribed fatal threshold for a prescribed period of time;

decreasing the speed of a supplemental channel (SCH) coupled to the mobile station if the number of the activation PNs is less than one;

comparing a previous activation PN strength with a second activation PN strength if the number of the activation PNs is greater than one; and decreasing the speed of the SCH if the previous activation PN strength is greater than the second activation PN strength and reassigning the SCH to the second activation PN if the second activation PN strength is greater than the previous activation PN strength.

4. The method of claim 1, wherein comparing the computed NAK RATE comprises increasing or decreasing a speed of a supplemental (SCH) of a transmission channel according to the mobile station's movement when a received data retransmission rate is determined to be greater than a fatal threshold for a prescribed period of time.

5. A method for controlling data transmission rate of a mobile communication system, wherein a base transmission station system transmits and receives data so as to transmit data received from an upper node to a mobile station, comprising:

(a) comparing an amount of data received from the upper node with a prescribed threshold, and adjusting a data transmission rate depending on a result of said comparison;

(b) computing a negative acknowledgment rate (NAK RATE) based on the increase or decrease of the data transmission rate when the data is transmitted or received; and (c) comparing the computed NAK RATE with a prescribed threshold, and adjusting the data transmission rate depending on a result of said NAK RATE comparison, comprising:

(c1) increasing or decreasing a speed of a supplemental (SCH) of a transmission channel according to the mobile station's movement when a received data retransmission rate is determined to be greater than a fatal threshold for a prescribed period of time; and (c2) changing the data transmission rate to HALF RATE if a number of activation pseudonoise sequences (PNs) is one, or if strengths of the activation PNs are less than the strengths of other activation PNs if the number of activation PNs is greater than one.

6. A method for controlling data transmission rate of a mobile communication system, wherein a base transmission station system transmits and receives data so as to transmit data received from an upper node to a mobile station, comprising:

(a) comparing an amount of data received from the upper node with a prescribed threshold, and adjusting a data transmission rate depending on a result of said comparison;

(b) computing a negative acknowledgment rate (NAK RATE) based on the increase or decrease of the data transmission rate when the data is transmitted or received; and (c) comparing the computed NAK RATE with a prescribed threshold, and adjusting the data transmission rate depending on a result of said NAK RATE comparison, comprising:

(c1) increasing or decreasing a speed of a supplemental (SCH) of a transmission channel according to the mobile station's movement when a received data retransmission rate is determined to be greater than a fatal threshold for a prescribed period of time;

(c2) ascertaining a number of present active pilot pseudonoise sequences (PNs) if a timer is terminated in a active wait state due to an influence of a wireless environment; and (c3) if the ascertained number of the active pilot PNs is greater than 1, making a transition to a reassign state and resetting a data transmission link to an optimal pilot PN with reference to a pilot strength and frame error rate (PER) that the mobile station receives.

7. The method of claim 1, wherein the base transmission station receiving data from the upper node controls the data transmission rate according to the amount of data received and the NAK RATE required by the mobile station.

8. A method for controlling data transmission rate of a mobile communication system, wherein a base transmission station system transmits and receives data so as to transmit data received from an upper node to a mobile station, comprising:

(a) checking data received from the upper node;
(b) determining whether a negative acknowledgment (NAK) occurrence, a frame retransmission, or a Radio Link Protocol reset (RLP RESET) process occurs;
(c) increasing or decreasing a negative acknowledgment rate (NAK RATE) by using information determined in step (b);
(d) resetting the data transmission rate using the increased or decreased NAK RATE;and
(e) determining whether a new channel can be assigned based on how long the increased or decreased NAK RATE remains greater than a preset fatal threshold if the controlled NAK RATE is greater than the preset fatal threshold, and transitioning to a reassign state or a rate down state according to a number active pseudonoise sequences (PNs) and increasing or decreasing the data transmission rate if the retransmission rate is greater than the preset fatal threshold and continues to be greater than the fatal threshold for a prescribed period of time.

9. A method for controlling data transmission rate of a mobile communication system, wherein a base transmission station system transmits and receives data so as to transmit data received from an upper node to a mobile station, comprising:

(a) checking data received from the upper node;
(b) determining whether a negative acknowledgment (NAK) occurrence, a frame retransmission, or a Radio Link Protocol reset (RLP RESET) process occurs;
(c) setting a negative acknowledgment rate (NAK RATE) based on information determined in step (b);
(d) comparing the set NAK RATE with a fatal threshold to control the data transmission rate; and
(e) resetting a new data transmission rate if a result of the comparison of step (d) continues for a prescribed amount of time, comprising; increasing the data transmission rate by reassigning a supplemental channel (SCH) to another pseudonoise sequence (PN) if the NAK RATE continues to be greater than the fatal threshold for the prescribed period of time, and there are two or more active codes.

10. The method of claim 9, wherein step (e) comprises decreasing a data transmission rate of the SCH by recognizing that interference exists in a boundary area of the base transmission station if there are a plurality of active PNs and a selected PN strength is the same as a reference PN strength.

11. The method of claim 9, wherein the data transmission rate of the SCH assigned to the other PN is set to a conventional data transmission rate.

12. The method of claim 9, wherein step (e) comprises decreasing the data transmission rate if the NAK RATE is not greater than the fatal threshold for a prescribed period of time and there is one or less active codes.

* * * * *